United States Patent [19]

Takatori et al.

[11] Patent Number: 5,430,829
[45] Date of Patent: Jul. 4, 1995

[54] LEARNING METHOD FOR A DATA PROCESSING SYSTEM

[75] Inventors: Sunao Takatori; Makoto Yamamoto, both of Tokyo, Japan

[73] Assignee: Sharp Corporation, Tokyo, Japan

[21] Appl. No.: 58,049

[22] Filed: May 7, 1993

Related U.S. Application Data

[63] Continuation of Ser. No. 680,116, Apr. 3, 1991, abandoned.

[30] Foreign Application Priority Data

Apr. 4, 1990 [JP] Japan .................................... 2-88162

[51] Int. Cl.$^6$ ............................................. G06F 15/18
[52] U.S. Cl. ....................................................... 395/23
[58] Field of Search ......................................... 395/23

[56] References Cited

U.S. PATENT DOCUMENTS 4,874,963 10/1989 Alspector ................................. 377/2
5,033,006 7/1991 Ishizuka et al. ......................... 395/23

OTHER PUBLICATIONS

Rumelhart et al, "Learning Internal Representations by Error Progagation", Parallel Distribution Processing, vol. 1, Foundation, Rumelhart et al, MIT Press, 1986, pp. 318–362.
Lippmann, R. P., "An Introduction to Computing with Neural Nets,"IEEE ASSP Magazine, Apr. 1987, 4–20.
IEEE International Conference on Neural Networks, Shpanski "Fast Learning In Artificial Neural Systems: Multilayer Perceptron Training Using Optimal Estimation", vol. 1, Jul. 1988, pp. 465–472.
IEEE First International Conference on Neural Networks, McAulay "Engineering Design Neural Networks Using Split Inversion Learning", vol. 4, Jun. 1987, pp. 635–642.
AIP Conference Proceedings 151: Neural Networks for Computing, Lapedes "Programming A Massively Parallel Computation Universal System: Static Behaviour", pp. 283–298, 1986.
Lampinen et al., Fast Self-Organization by the Probing Algorithm, Lappennranta University of Technology, Department of Information Technology, Box 20 Sf-53851 Lappeenranta, Finland, IJCNN, Jun. 1989, II-503-507.

*Primary Examiner*—Robert W. Downs
*Attorney, Agent, or Firm*—Cushman, Darby & Cushman

[57] ABSTRACT

A learning method for a data processing system comprising an input layer and an output layer which comprise a plurality of neurons, each of which outputs predetermined data after activating according to the predetermined processing results performed onto an input data. A middle layer is arranged between the input and output layer, the middle layer comprising a plurality of neurons each of which is connected to each neuron of the input and output layer. The activation patterns of the input layer and the output layer are determined arbitrarily according to a plurality of inputs and outputs. Weights of synapses of the middle layer and the output layer are increased so as to obtain the tendency that the activation pattern of the middle layer becomes the nearest approximation to the activation patterns of the input layer and the output layer according to each input and output. This method is performed with respect to all inputs and outputs.

3 Claims, 3 Drawing Sheets

LEARNING METHOD FOR A DATA PROCESSING SYSTEM

This is a continuation of application Ser. No. 07/680,116, filed on Apr. 3, 1991, which was abandoned upon the filing hereof.

BACKGROUND OF THE INVENTION

1. Field of the Invention

The present invention relates to a data processing system according to the concept of a neural network.

2. Background Information

A neural network is structured with parallel layers of neurons, a neuron 1, being shown in FIG. 3. Neurons in each layer are connected to all neurons in other adjacent layers, so as to input and output data. According to FIG. 3, data 0 is outputted in accordance with the comparison result between the sum of multiplied input data from outside I1, I2, I3 ... In by weights W1, W2, W3 ... Wn and threshold $\Theta$.

Various comparison methods are possible. For example, when normalization function 1[f] is applied, output data 0 is expressed as follows:

$$0 = 1[\Sigma Wn \cdot In - \Theta] \quad (1)$$

That is, when $\Sigma$ Wn·In exceeds threshold $\Theta$, the neuron activates so that output data 0 becomes "1"; and when $\Sigma$Wn·In is smaller than threshold $\Theta$, output data becomes "0".

A conventional neural network is structured to form neural layers by arranging neurons in parallel and connecting the neural layers in series. Neural layers, for example, comprise three layers, namely, an input layer, a middle layer and an output layer. This is described as Perceptrons, as proposed by Rosenblatt, in which neurons of each layer are synapse-connected to all neurons of other adjacent layers.

SUMMARY OF THE INVENTION

According to the data processing system of the present invention, the operation of weight optimization of synapses for each neuron is called "learning". The improvement of the efficiency and the guarantee of the realization in neural networks are important subjects to be investigated. For example, as to a back propagation method, which came into the public recently, problems such as the convergence to local minimum and convergence time exist. Such problems are prevalent, especially with respect to the neural network including a plurality of middle layers.

It is, therefore, an object of the present invention to solve the above-mentioned problems of the prior art by providing an efficient learning method based on the middle layers.

A learning method according to the present method is characterized in the following steps: the activation patterns of the input layer and the output layer are determined arbitrarily according to input and output data; weights of synapses in the middle layer and the output layer are increased so as to obtain the tendency that the activation pattern of the middle layer becomes the nearest approximation to the activation patterns of the input layer and the output layer; once the learning of a middle layer up to a predetermined stage is completed, a new middle layer is added and the above learning process is performed onto the additional layer, where the middle layers are added sequentially. Here, the numbers of neurons in the input and output layers are determined by data capacity at a time, and the number of data that can be processed is determined by the number of neurons of a whole neural network. Therefore, it is essential to increase the number of middle layers for many data processings. A calculation method for the nearest approximation is the minimum square approximation, for example.

PREFERRED EMBODIMENTS OF THE PRESENT INVENTION

Hereinafter, the present invention will be described by referring to the attached drawings.

Figure 1:
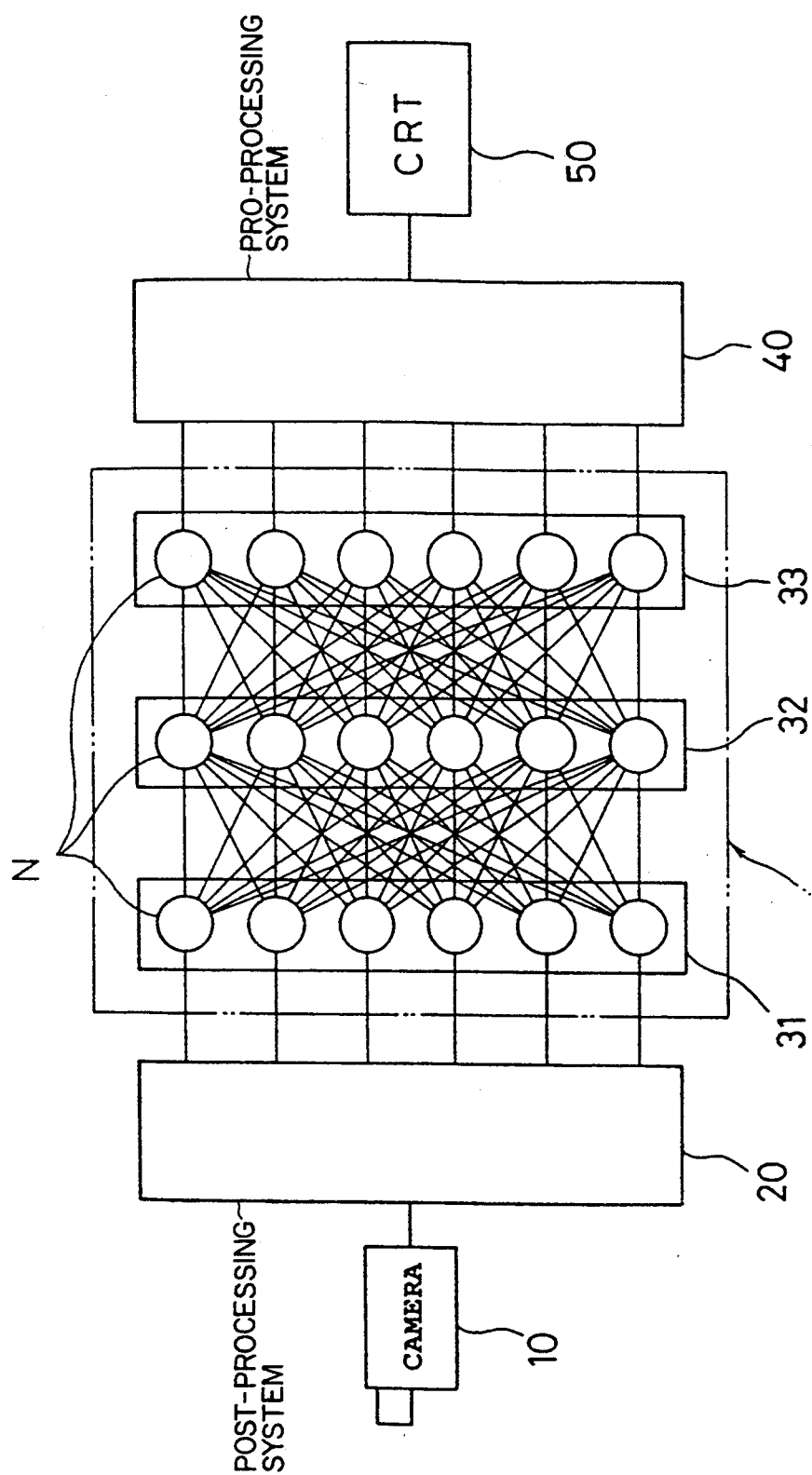
FIG. 1 shows a structural diagram of a character recognition system according to an embodiment of the present invention.

FIG. 1 shows a character recognition system comprising a data processing system according to a learning method of an embodiment of the present invention. This character recognition system comprises a video camera 10, a preprocessing system 20, a data processing system 30, a post-processing system 40 and a display 50. A video camera 10 receives input characters and is connected to a preprocessing system 20. A preprocessing system 20, is for example, an image processing system that extracts the characteristics data of an input character (for example, number of end points, number of branch points, etc.) and outputs this characteristics data to a data processing system 30. A data processing system 30 has the structure of a neural network, as will be described later, and outputs data to a post-processing system 40 according to the recognition result by recognizing an input character from a preprocessing system 20 according to its characteristics data. A recognition signal is, for example, a character code. A post-processing system 40 stores the above output data as, for example, a data of a word processor, and outputs it to a display 20, simultaneously. Display 50, for example, having a CRT, displays recognized character by a data processing system 30 onto an image.

The neural network structure of data processing system 30 is structured as a part of the hardware. This data processing system 30, indicated in FIG. 1, comprises input layer 31, middle layer 32 and output layer 33 in which middle layer 32 is arranged between input layer 31 and output layer 33, as it is understood from this figure. According to the present embodiment, each layer 31, 32 and 33 comprises an equivalent number of neurons N, in which neurons N of input layer 31 are connected to all neurons N of middle layer 32, and neurons N of middle neural layer 32 are connected to all neurons N of output layer 33.

Figure 3:
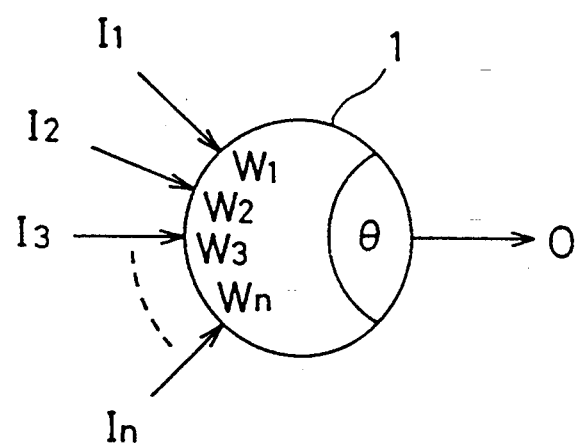
FIG. 3 shows a schematic diagram of a neuron.

Each neuron N outputs either "1" or "0" according to the formula (1) of the normalization function, as it is described with referring to FIG. 3. Neuron N is, for example, an operation amplifier. Weight Wn to be multiplied by a data input to each neuron N is obtained, for example, by a variable resistance connected to an input terminal of an operation amplifier. A threshold function is realized by, for example, switching elements. Accordingly, weight Wn is changed and output data is connected by changing variable resistance with respect to the output data of each neuron, so as to perform the learning control.

Figure 2:
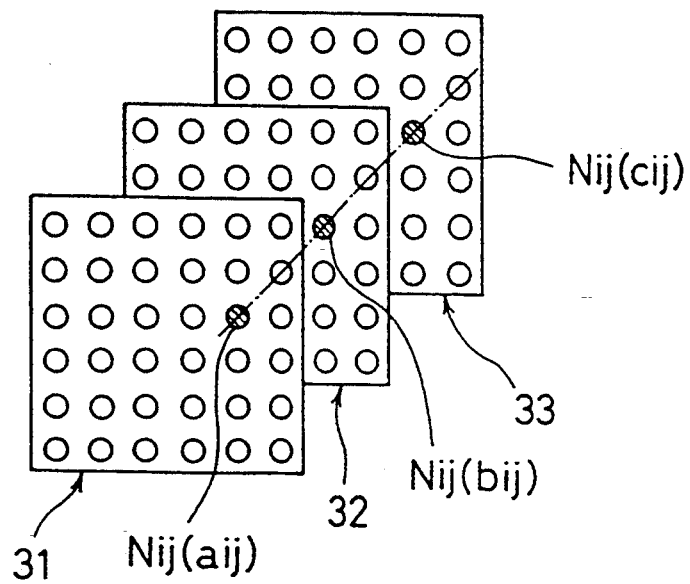
FIG. 2 shows a schematic diagram of neurons in an input layer, a middle layer and an output layer.

FIG. 2 shows a typical input layer 31, middle layer 32 and output layer 33, comprising an equivalent number of neurons among themselves. Here, it is determined that the number of neurons in each layer 31, 32 and 33 is 36, for simplicity, in which 6 neurons are arranged in a horizontal direction and 6 neurons are arranged in a vertical direction. When the location of a neuron at the bottom left corner in this figure is determined as an origin, a neuron at the i-th and the j-th location from the origin is determined as Nij.

Each neuron of an input layer 31 activates with respect to characteristics data of character input through a video camera 10. For example, it is deemed that a number of end points is expressed by activation pattern of N11, N12, N21 and N22; and a number of branch points is expressed by activation patterns of N13, N14, N23 and N24. Accordingly, activation patterns of neurons of an input layer 31 is determined in accordance with an input character, arbitrarily.

On the other hand, at output layer 33, a character is expressed, for example, by neuron Nii on a diagonal line connecting neurons at the lower left corner and the lower right corner. Accordingly, neurons on the above diagonal line express character codes of a character. The activation pattern of neurons of an output layer 33 is determined arbitrarily. According to the present embodiment, the number of activation patterns of neuron Nii on the diagonal line is 64. Therefore, it is possible to recognize 64 kinds of characters, according to the present embodiment, so that recognition of, for example, the alphabet is possible.

Before the learning of character recognition is performed, neurons of output layer 33 do not activate even if character data is input to a data processing system 30. The activation of a neuron becomes possible by learning, and learning will be completed when the predetermined activation pattern is output in accordance with input character data. The input and output patterns for learning is the representative data to be processed at the neural network. Data to be processed actually covers a wide area. Learning is continuously executed until an adaptable association is performed with respect to the above representative input and output data. Therefore, when learning is completed, input layer 31 and output layer 33 output arbitrarily determined activation patterns, as it is described above, according to input character data. Then, it is assumed that the activation patterns of input layer 31, middle layer 32 and output layer 33 are changed smoothly over the layers 31, 32 and 33. According to the present embodiment, weights of middle layer 32 and output layer 33 are changed in a process of learning so that the activation patterns of the above layer change smoothly.

Here, the location of a neuron at the lower left corner is determined as an origin, and an output data of neuron Nij of an input layer 31 at the i-th and j-th location from the origin is determined as aij. Similar to the above, output data of neuron Nij of a middle layer 32 is determined as bij; and output data of neuron Nij of an output layer 33 is determined as cij.

The sum of squares of the differences among each neuron of each layer 31, 32 and 33 is expressed as follows:

$$f = \Sigma\{(aij-bij)^2 + (bij-cij)^2\}$$

Accordingly, the above sum of squares f is the square distance with respect to the relationship between activation patterns. Here, Z indicates that i and j take the sum from 1 to 6.

Once an input character is determined, aij and cij are fixed, but bij is not. Therefore, bij, when the sum of squares f is the minimal value, is easily calculated by, for example, a method of the least squares as is generally known. According to the learning of character recognition, weights of each neuron of a middle layer 32 and an output layer 33 are increased by predetermined values so as to obtain bij, i.e. activation pattern, obtained as above. Hereinafter, the above processing is described with referring FIG. 3. Weights of synapses (in this case, "W2" and "W3") are, for example, increased by 5% with respect to input data from activated neurons (for example, "I2" and "I3") among neurons of the input layer connected with neuron 1 when output data 0(bij) of neuron 1 of a middle layer is the value at the activation (for example "1"). According to weights of synapse with respect to the neurons of the output layer, it is processed similar to the above. As it is described above, weights of synapse are, for example, increased by 5% with respect to neurons of a middle layer that are determined to be activated by a method of least squares.

Accordingly, weights of a middle layer 32 and an output layer 33 are increased so that the activation patterns are smoothly changed over layers of an input layer 31, a middle layer 32 and an output layer 33. Here, when each neuron of an input layer 31 and an output layer 33 is determined to activate with closer frequency with respect to all input characters, the equivalent activation among each neuron of a middle layer 32 becomes possible. Accordingly, it is possible to prevent converging to a local minimum. Furthermore, each neuron of a middle layer 31 will activate approximately equivalently. Therefore, it is possible to avoid the occurrence of neurons not activating, thereby, efficiently processing middle layer 32.

Figure 4:
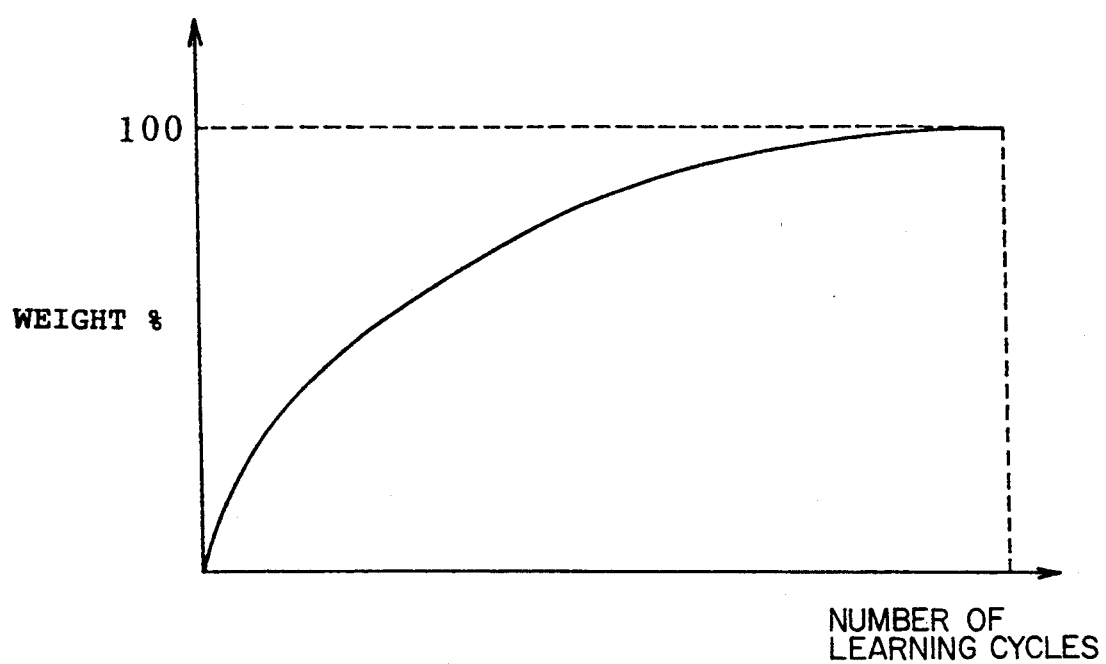
FIG. 4 is a graph showing the relationship between the number of learnings and weight change.

The weight increase of synapse for a learning change is shown in FIG. 4 with respect to the number of learnings. The learning for a whole system is gradually performed by a plurality of learnings, and a slight adjustment is performed with a little change at the end of learning. Learning speed is heightened as weight increases rapidly at the beginning of learning.

According to the above embodiment, there are 3 layers; a middle layer 32 is connected to an input layer 31 and an output layer 33. However, the present invention can be applied not only to the neural network with 3 layers but also the neural network with more than 3 layers. In this case, one middle layer should be selected first, then weights of synapses of neurons at the middle layer and an output layer are to be increased so that the sum of squares of the activation patterns become the minimum value between that in a middle layer and in an input layer 31 and output layer 33. After completing the learning with respect to all input characters up to the predetermined level, the next learning is performed by increasing the weights of synapses of neurons in the second middle layer and an output layer so that the sum of squares of the activation pattern of the second middle layer becomes the minimum value according to the activation patterns of the other 2 layers adjacent to the above middle layer (the first middle layer and an input layer or an output layer). Accordingly, weight distribution with respect to the neural network with 4 layers is obtained. The same processing manner is applied to the neural network with more than 4 layers.

The method for deciding weight distribution of middle layer 32 and output layer 33 can be achieved with various method, other than the first embodiment above.

For example, the absolute value of the difference of output data of neurons of each layer can be considered. That is, "f" of the Hamming distance is considered, which is the accumulated value of $|aij-bij|$ and $|bij--cij|$ regarding all neurons.

$$f = \Sigma\{|aij-bij| + |bij-cij|\}$$

Here, $|aij-bij|$ is the absolute value of the difference between an output data of neurons of input layer 32 and an output data of a neurons of middle layer 32, and $|bij-cij|$ is the absolute value of the difference between an output data of middle layer 32 and an output data of output layer 33. In this embodiment, "$\Sigma$" is the accumulation from 1 to 6 with respect to "i" and "j". "aij" and "cij" are fixed when the input character is decided, but only "bij" is not fixed. Therefore, "bij" on the minimum value of Hamming distance "f" can be easily determined when learning character recognition, the weights of each neuron of middle layer 32 and output layer 33 are increased by a predetermined value in order to obtain "bij" of an activation pattern.

This is explained below referring to FIG. 3. When output data "O(bij)" of the middle layer is the activation value ("1" for example,), synapse weight ( "W2" and "W3") corresponding to input data from activated neuron ("I2" and "I3", for example) among the neurons of input layer connected to neuron 1 is increased 5%, for example. The weight of synapse of a neuron of the output layer is processed in the same way. Therefore, the weight of synapse corresponding to the neuron of the middle layer decided to be activated from the Hamming distance is increased 5%, for example.

The same effect of the first embodiment can be obtained by the second embodiment, too.

The second embodiment can be also applied to a neural network with neural layers of 4 or more, other than the neural network with 3 layers, similar to the first embodiment. In this case, selecting the first middle layer, the weight of the synapses in the first middle layer and output layer are increased in order for the sum to be the minimum value, that is, in order for the Hamming distance to be the minimum value. Here, the "sum" means the total value of the absolute value of the difference between the output data of each neuron of input layer 31 and that of the first middle layer, and the absolute value of the difference between the output data of each neuron of the first middle layer and that of output layer 33. When the learning up to the predetermined stage is completed with respect to all input characters, the second middle layer is newly added and the weight of the synapse is increased in the second middle layer and the layer connected to the output side of the second middle layer (output layer or the first middle layer), in the same way of the first middle layer in order for the Hamming distance to be the minimum value. Consequently, weight distribution for 4 layers can be obtained. The same processing is executed for the case with 5 layers or more.

The third embodiment of the present invention is described next. The coordination of neuron Nij in each layer 31, 32 and 33 is the same and they correspond to one another.

In order for the activation pattern of each layer of 31, 32 and 33 to change smoothly, the neuron of middle layer 32 has the tendency to activate when corresponding neuron in input layer 31 and output layer 33 both activate. Therefore, in this embodiment, the weight of synapse of a predetermined neuron of middle layer 32 and output layer 33 is increased by the predetermined rate in order for each neuron in middle layer 32 to activate easily when the neuron of input layer 31 and corresponding neuron in output layer 33 are both activated.

This is shown in FIG. 2 and FIG. 3. In this illustration, neuron Nij of output layer 33 is assumed to be the part of a character code.

When neuron Nij in input layer 31 and neuron Nij in output layer 33 are both to be activated for recognizing a character, the weight distribution of synapses of middle layer 32 and output layer 33 is such that neuron Nij in middle layer 32 activates easily. For example, when neuron 1 in FIG. 3 is a neuron Nij of middle layer 32, the weight of the synapse corresponding to the input data from activated neuron among the neurons of input layer connected to neuron 1 is increased by 5%. When input data "I2" and "I3" activate, the weight of the synapse "W2" and "W3" are increased. The same processing is performed to the weight of synapse of neurons of the output layer, that is, the weight of the synapse corresponding to the neuron to the activated in the middle layer is increased by 5%, for example.

From the third embodiment, the same effect of the first and the second embodiments can be obtained, too. The third embodiment can be also applied to the neural network with 4 layers or more, other than the neural network with 3 layers, as the first and the second embodiment. In this case, selecting the first middle layer, the weight of the synapse of the middle layer and the output layer is increased so that each neuron in the middle layer obtains the tendency to activate when the corresponding neurons in input layer and output layer are both activated. When the learning up to the predetermined stage is completed, the second middle layer is added and the weight of synapse is increased in the second middle layer and the layer connected to the output side of the middle layer (output layer or the first middle layer) in the same way as the first middle layer. In this way, the weight distribution if obtained in the case of 4 layers. The same processing is executed in the case of more than 5 layers.

The fourth embodiment of the present invention is explained below. It is considered that the activation patterns of the layers 31, 32 and 33 change smoothly when the neuron in middle layer 32 has the tendency to activate only in the case that at least one of corresponding neurons in input layer 31 and output layer 33 activates. Therefore, in this embodiment, the weight of synapse of a predetermined neuron is increased by the predetermined rate in order that each neuron in middle layer 32 activates easily when at least one of corresponding neurons in input layer 31 and output layer 33 activates.

This is described in detail referring FIG. 2 and FIG. 3. A neuron Nij in output layer 33 is assumed to be a constituent part of a character code, as the case of the third embodiment.

When at least one of neurons Nij in input layer 31 and output layer 33 is to activate for recognizing a character, the weight distribution of synapses in middle layer 32 and output layer 33 is to be decided in order for neuron Nij in middle layer 32 to activate easily. For example, when neuron 1 in FIG. 3 is the neuron Nij of middle layer 32, the weight of the synapse of input data from activated neuron among the neurons in input layer connected to neuron 1 is increased by 5%. When input data is "I2" and "I3" the weight of the synapse to be increased weight is "W2" and "W3". The weight of the synapse of the neuron in output layer is performed the same processing. As described above, the weight of synapse of the neuron in middle layer to activate is increased by 5%, for example.

From the fourth embodiment, the same effect of the embodiments above can be obtained. The fourth embodiment can be also applied to the neural network with 4 layers or more, other than the neural network with 3 layers. In this case, selecting the first middle layer, the weight of the synapse of the middle layer and output layer is increased so that each neuron in the middle layer obtains the tendency to activate when at least one neuron of the corresponding neurons in input layer and output layer activates. When the learning up to the predetermined state is completed, the second middle layer is added and the weight of synapse is increased in the second middle layer and the layer connected to the output side of the middle layer (output layer or the first middle layer) in the same way as the first middle layer. In this way, the weight distribution is obtained in the case of 4 layers. The same processing is executed in the case of 5 or more layers.

Input/output data for a neuron does not have to be the binary data. Multi-valued data and analog are also acceptable. Furthermore, an output layer is not necessarily structured by the neurons on a diagonal line to express the character codes; it is possible to be structured by all neurons to define the recognition character. The number of neurons for each layer 31, 32 and 33 is not limited to 36, as in the present embodiment. As many necessary neurons as the number of kinds of character to be recognized can be used.

It is possible to apply the present invention not only to the character recognition but also the configuration recognition or acoustic recognition. According to the present invention as mentioned above, it is possible to obtain an effect that an efficient learning can be performed onto the middle layer of the neural network.

What is claimed is:

1. A learning method for transforming an untrained network to a trained network, said network comprising an input layer, a middle layer and an output layer, each said layer including a plurality of neurons, each said neuron being a signal processing element, said middle layer being arranged between said input and output layers wherein each neuron in said middle layer is connected to each neuron in said input and output layers, said method comprising the steps of:
   determining an activation pattern of neurons in said input layer;
   determining an activation pattern of neurons in said output layer;
   increasing the value of weights applied to all neurons in said input layer which are connected to a neuron in said middle layer and weights applied to all neurons in said output layer which are connected to said neuron in said middle layer, so that a summation over a number of said neurons becomes a minimum value, said summation being an absolute value of a difference between neuron output data from said input layer and neuron output data from said middle layer plus an absolute value of a difference between neuron output data from said middle layer and neuron output data from said output layer; and
   repeating the above steps for each said neuron in said middle layer, thereby generating a desired activation pattern of neurons in said middle layer corresponding to said trained network.

2. The learning method of claim 1 further including the steps of:
   a.) adding an additional middle layer between said input layer and said middle layer or between said middle layer and said output layer, said additional middle layer having a plurality of neurons;
   b.) connecting each neuron in said additional middle layer to each neuron in the two layers adjacent to said additional middle layer;
   c.) increasing the value of weights applied to all neurons in said two adjacent layers which are connected to a neuron in said additional middle layer so that a summation over a number of neurons becomes a minimum value, said summation being an absolute value of a difference between neuron output data from one of said adjacent layers and neuron output data from said additional middle layer plus an absolute value of a difference between neuron output data from said additional middle layer and neuron output data from said other adjacent layer; and
   d.) repeating steps b.) and c.) for each neuron in said additional middle layer, thereby generating a desired activation pattern of neurons in said additional middle layer corresponding to said trained network.

3. The learning method of claim 1, wherein said learning method is a method for recognizing characters, said activation pattern in said input layer corresponds to characteristics data of an image, and said activation pattern in said output layer corresponds to character data of said image.

* * * * *